United States Patent
Suzuki

(10) Patent No.: US 9,417,405 B2
(45) Date of Patent: Aug. 16, 2016

(54) ELECTRONIC DEVICE

(71) Applicant: SONY CORPORATION, Tokyo (JP)

(72) Inventor: Kazuyoshi Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/337,512

(22) Filed: Jul. 22, 2014

(65) Prior Publication Data

US 2015/0043881 A1 Feb. 12, 2015

(30) Foreign Application Priority Data

Aug. 6, 2013 (JP) ................................ 2013-163201

(51) Int. Cl.
*G02B 6/00* (2006.01)
*G02B 6/38* (2006.01)

(52) U.S. Cl.
CPC ............ *G02B 6/3866* (2013.01); *G02B 6/3895* (2013.01)

(58) Field of Classification Search
None
See application file for complete search history.

(56) References Cited

U.S. PATENT DOCUMENTS

| | | | | |
|---|---|---|---|---|
| 8,727,636 B2* | 5/2014 | Isenhour | .............. | G02B 6/3807 385/70 |
| 9,028,154 B2* | 5/2015 | Hui | ....................... | G02B 6/3825 385/134 |
| 2002/0162582 A1* | 11/2002 | Chu | ......................... | B08B 3/02 134/105 |
| 2003/0169991 A1* | 9/2003 | Malevanets | ............. | B08B 1/008 385/134 |
| 2004/0005134 A1* | 1/2004 | Sun | ........................... | B08B 3/12 385/134 |
| 2014/0340372 A1* | 11/2014 | Olsson | .................. | G06F 3/0338 345/184 |

FOREIGN PATENT DOCUMENTS

JP 2002-311349 A 10/2002

* cited by examiner

*Primary Examiner* — Sung Pak
(74) *Attorney, Agent, or Firm* — Chip Law Group

(57) ABSTRACT

There is provided an electronic device including a vibration portion which generates vibration, an optical connector to which an optical cable is connected, and a substrate on which the vibration portion and the optical connector are mounted.

11 Claims, 8 Drawing Sheets

ELECTRONIC DEVICE

CROSS REFERENCE TO RELATED APPLICATIONS

This application claims the benefit of Japanese Priority Patent Application JP 2013-163201 filed Aug. 6, 2013, the entire contents of which are incorporated herein by reference.

BACKGROUND

The present disclosure relates to an electronic device.

In recent times, optical communication employing an optical cable and an optical connector (SC connector, LC connector, and the like) is widely used. In the optical communication, when wastes adhere to a joint portion (joint surface of the optical connector) in which the optical communication is performed, it is difficult to perform the communication. Therefore, before joining the connector to a device, a dealer performs cleaning of the joint portion in which the optical communication is performed using an exclusive cleaning unit.

With respect to a cleaning method of an optical switch device, JP 2002-311349A describes that, in a cleaning operation, an optical fiber holding member is moved to a cleaning mechanism by the drive of a motor, so that a fiber end surface is cleaned.

SUMMARY

However, in the cleaning, a dealer who has technical knowledge performs the cleaning using an exclusive cleaning unit. Therefore, it is difficult for general users to properly perform the cleaning. Accordingly, the optical communication is mainly used for infrastructure systems in which the number of times of connection and disconnection of an optical connector is small and a dealer who has technical knowledge performs the cleaning using an exclusive cleaning unit in connection, whereby secure communication is realized.

On the other hand, it is assumed that the optical communication is widely expanded to common devices in which frequencies of connecting and disconnecting a connector by general users are high, such as mobile devices, such as a cellular phone, and stationary devices, such as a television set. However, when considering the future expansion to various devices, it is very troublesome for general users to perform the cleaning in each connection in the connector which is frequently connected and disconnected by the general users. Moreover, there also is a problem in that the cost in each cleaning including the price of a cleaner increases. Therefore, in the device having an optical connector which is frequently connected and disconnected by general users, it is difficult to secure the reliability of the optical communication of the joint portion by performing the cleaning by the above-described method.

JP 2002-311349A describes that an optical fiber holding member is moved to a cleaning mechanism by the drive of a motor, so that a fiber end surface is cleaned. However, when a motor for cleaning is separately provided, there is a problem in that the manufacturing cost increases. Moreover, with the configuration described in JP 2002-311349A, since the motor and the optical fiber holding member are connected through a wire, it is also difficult to save the space.

Then, it has been demanded to certainly remove dirt and dust adhering to the optical connector with a simple configuration.

According to an embodiment of the present disclosure, there is provided an electronic device including a vibration portion which generates vibration, an optical connector to which an optical cable is connected, and a substrate on which the vibration portion and the optical connector are mounted.

An electronic component may not be not mounted on the substrate between the vibration portion and the optical connector.

The electronic device may include a fixing portion which fixes the substrate to a case, and the vibration portion and the optical connector may be disposed in a region separated from the fixing portion by a notch formed in the substrate.

A hole which penetrates the substrate may be provided in a region between the vibration portion and the optical connector.

The electronic device may further include a vibration transmission member which contacts both the vibration portion and the optical connector and which transmits vibration of the vibration portion to the optical connector.

The vibration portion may contain a vibrator which notifies an incoming call.

The vibration portion may contain a speaker which generates a sound.

The electronic device may further include a connection judging portion which judges that the optical cable is connected, and a vibration control portion which vibrates the vibration portion when the optical cable is connected.

The electronic device may further include an operation input acquisition portion which acquires an operation input by a user, and a vibration control portion which vibrates the vibration portion based on the operation input by the user.

The electronic device may further include a communication state judging portion which judges a communication state through the optical cable connected to the optical connector, and a vibration control portion which vibrates the vibration portion based on the communication state.

The electronic device may further include a display control portion which performs control for a display of evoking physical cleaning of the optical connector when it is judged by the communication state judging portion that the communication state is not good by a predetermined number of times or more.

According to the present disclosure, dirt and dust adhering to the optical connector can be certainly removed with a simple configuration.

The above-described effect is not necessarily restrictive, and any effect described in this specification or another effect which can be understood from this specification may be demonstrated with the above-described effect or in place of the above-described effect.

DETAILED DESCRIPTION OF THE EMBODIMENT(S)

Figure 1:
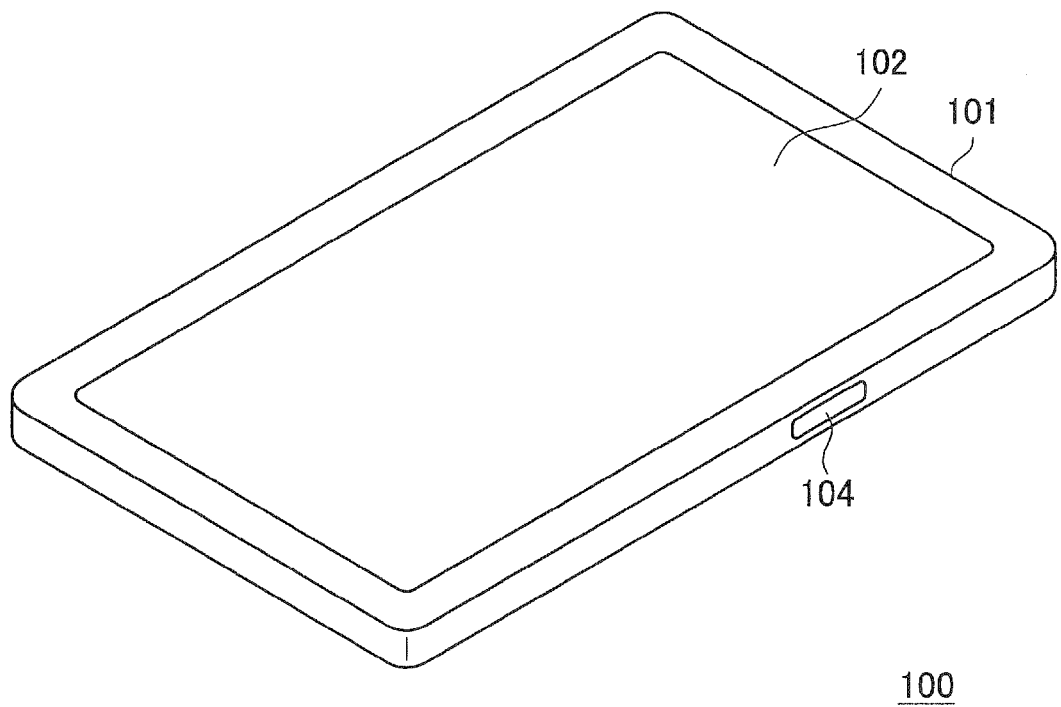
FIG. 1 is a schematic view illustrating the appearance of an electronic device according to one embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is given in the following order:
1. Configuration example of appearance of electronic device
2. Configuration example of main substrate of electronic device
3. Processing of generating vibration
4. Configuration example of electronic device

1. Configuration Example of Appearance of Electronic Device

FIG. 1 is a schematic view illustrating the appearance of an electronic device 100 according to one embodiment of the present disclosure. In this embodiment, a smartphone is mentioned as an example, as the electronic device 100 but the electronic device 100 is not limited thereto. The electronic device 100 may be another device, such as a tablet terminal, a game machine, and a notebook personal computer.

As illustrated in FIG. 1, the electronic device 100 has a liquid crystal panel 102 on the surface. Moreover, the electronic device 100 has an optical connector 104 to which an optical cable is connected on the side surface.

2. Configuration Example of Main Substrate of Electronic Device

Figure 2:
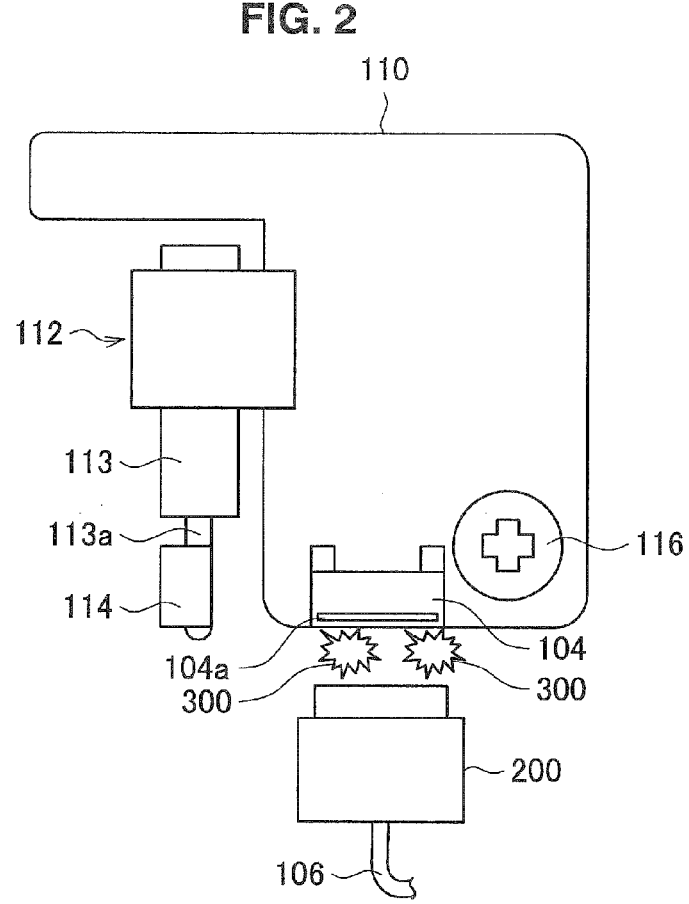
FIG. 2 is a plan view illustrating the configuration of a main substrate and the periphery thereof contained in the electronic device.

FIG. 2 is a plan view illustrating the configuration of a main substrate 110 and the periphery thereof contained in the electronic device 100. A liquid crystal panel 102 for display and a battery are connected to the main substrate 110 and a CPU which performs various kinds of processing and operations is provided in the main substrate 110. The main substrate 110 is disposed inside a case 101 of the electronic device 100 and is fixed to the case 101 by screws 116 and the like.

FIG. 2 illustrates an optical connector 104 and an optical cable 106 to be connected to the optical connector 104. When a joint surface 104a of the optical connector 104 faces an optical plug 200 of the optical cable 106 on the counter side, communication by light signals is performed. The electronic device 100 of this embodiment transmits light by laser light by the optical cable 106 to realize optical communication of about 10 to 100 Gbps bit rate as an example.

The utilization of an optical interface in consumer appliances is assumed with a spread of a high definition screen in the future. However, when foreign substances, such as wastes and dust, adhere to the optical interface, the optical interface fails to achieve the function due to the characteristics.

In this embodiment, in the optical interface (optical connector 104) provided in the electronic device 100, such as a smartphone, dirt, dust, and the like adhering to the end surface (joint surface 104a) thereof are removed by vibrating the optical connector 104. In order to apply the vibration to the optical connector 104, the vibration of a vibrator 112 or a speaker which notifies an incoming call is used. Thus, an exclusive cleaner which is expensive and is troublesome is not used and the necessity of adding an exclusive component to the electronic device 100 is also eliminated, so that an increase in the manufacturing cost for removing dirt and dust can be avoided. Therefore, the removal effect of wastes adhering to the contact point of the optical connector 104 can be obtained at low cost, and communication with high reliability through the optical connector 104 can be secured.

Thus, when dirt and dust 300 adhere to the vicinity of the joint surface 104a of the optical connector 104, the electronic device 100 according to this embodiment removes the dirt and dust 300 by vibration. Hereinafter, a detailed description is given.

The main substrate 110 carries the optical connector 104 to which the above-described optical cable is connected and the vibrator 112 for notifying an incoming call. The vibrator 112 contains a motor 113 and an eccentric weight 114 attached to a rotation shaft 113a of the motor 113, in which the rotation shaft 113a of the motor 113 rotates by the application of a voltage with an incoming call to transmit the vibration to the case 101 to which the main substrate 110 is fixed.

The vibrator 112 is mounted with the optical connector 104 on the same main substrate 110 in a fixation manner. Thus, the vibration of the vibrator 112 is transmitted to the optical connector 104 in the state where the strength of the vibration is high. Furthermore, it is desirable that the vibrator 112 is placed at a position as close as possible to the mounting position of the optical connector 104. Between the vibration application source by the vibrator 112 and the optical connector 104, a clamping member which interrupts the transmission of the vibration, such as the screws 116, is not provided. Moreover, between the vibration application source by the vibrator 112 and the optical connector 104, another electronic component is not mounted. Thus, the vibration of the vibrator 112 can be efficiently transmitted to the optical connector 104.

Thus, dirt, dust, and the like adhering to the optical connector 104 are removed from the optical connector 104 by vibrating the vibrator 112. Therefore, an obstacle occurring in the communication due to the dirt and dust and the like adhering to the optical connector 10 can be securely prevented.

Figure 3:
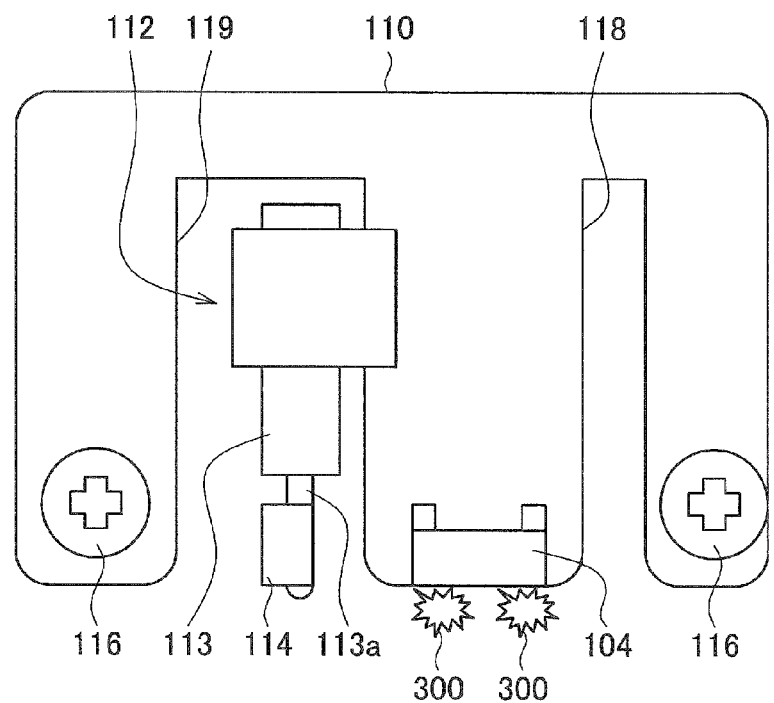
FIG. 3 is a plan view illustrating an example in which a notch is formed between a placement region of an optical connector and a screw.

FIG. 3 is a plan view illustrating an example in which a notch 118 is provided between the placement region of the optical connector 104 and the screws 116. Thus, the rigidity of the substrate 110 can be reduced, so that the restraint of the vibration of the vibrator 112 by the screw 116 can be securely prevented. Moreover, by providing notches 118,119 in the circumference of the region where the vibrator 112 and the optical connector 104 are attached, a region where the vibrator 112 and the optical connector 104 are attached can be securely vibrated. Thus, by providing the notch 118 between the screws 116, the attenuation of the vibration applied by the vibrator 112 can be securely prevented.

Figure 4:
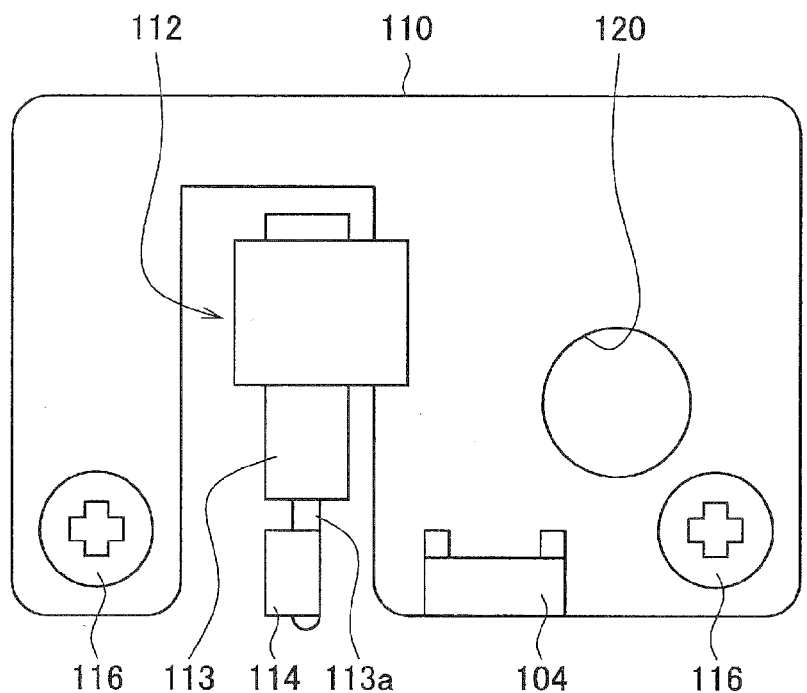
FIG. 4 is a schematic view illustrating an example in which a hole is provided in the vicinity of an optical connector and a screw.

FIG. 4 is a schematic view illustrating an example in which a hole 120 is formed in the vicinity of the optical connector 104 and the screw 116. Also in the example of FIG. 4, by providing the hole 120, the restraint of the vibration by the screw 116 can be securely prevented.

Figure 5:
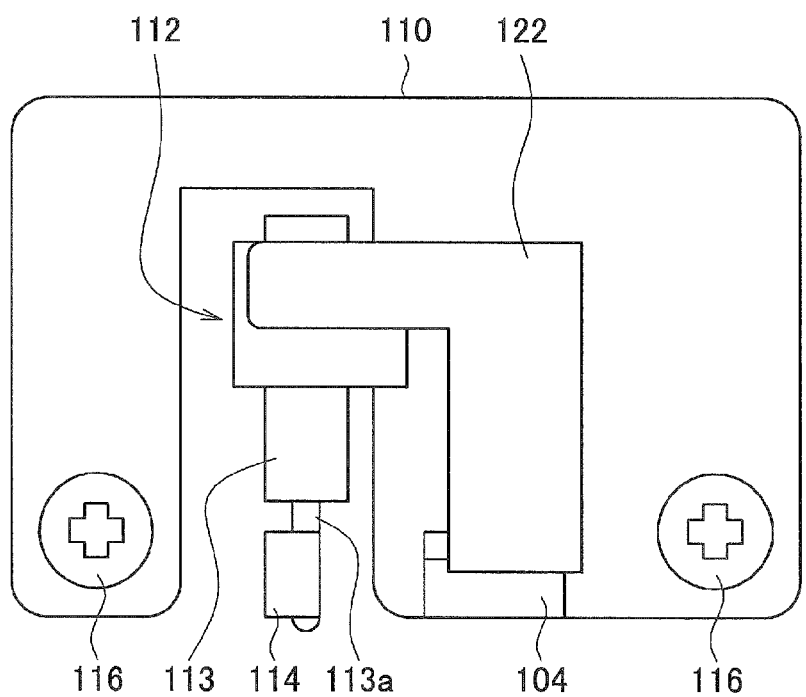
FIG. 5 is a schematic view illustrating an example in which a vibrator and the optical connector are connected by a connection member.

FIG. 5 is a schematic view illustrating an example in which the vibrator 112 and the optical connector 104 are connected by a connection member (a vibration transmission member) 122. In the example of FIG. 5, the vibration of the vibrator 112 is transmitted to the optical connector 104 through the main substrate 110 and also transmitted to the optical connector 104 through the connection member 122. Thus, the vibration of the vibrator 112 can be more securely and more efficiently transmitted to the optical connector 104.

The vibration is generated from the vibrator 112 in the examples described above but another member may be used as the generation source of the vibration. For example, since a speaker for sounds is mounted in the electronic device 100, such as a smartphone, the speaker for sounds can also be used as the vibration source.

In the examples described above, a smartphone is mentioned as an example as the electronic device 100, the electronic device 100 may be a stationary device, such as a television set.

By constituting the optical connector 104 and the optical plug 200 as described above, the dirt and dust 300 which become a cause of blocking the acceptance of light signals can be removed from the optical connector 104 by vibration. As the mass of the dirt and dust 300 is larger, the dirt and dust 300 can be more surely removed.

3. Processing of Generating Vibration

The dust removal operation of the optical connector 104 by the vibration of the vibrator 112 is automatically performed when the power source of the electronic device 100 is turned ON and OFF. Or, the dust removal operation may be performed by an application program installed in the electronic device 100 before a user joins the optical plug 200 to the optical connector 104. Or, the dirt and dust 300 may be removed by performing the application of vibration by the vibrator 112 at periodical or arbitrary timing.

Figure 6:
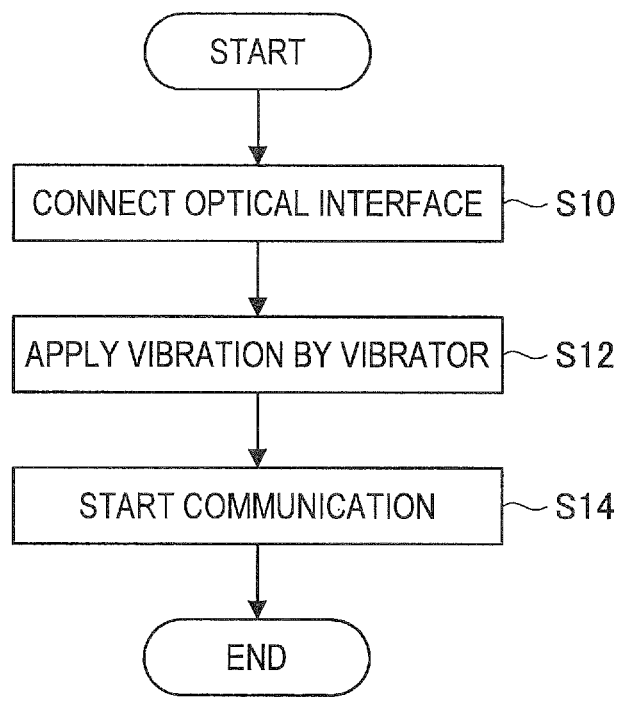
FIG. 6 is a flow chart showing processing of applying vibration by a vibrator when connecting the optical interface.

Hereinafter, the timing of generating the vibration of the vibrator 112 is described based on the flow charts of FIG. 6 to FIG. 9. First, FIG. 6 is a flow chart showing the processing of performs the application of vibration by the vibrator 112 when the optical interface is connected. First, the connection of the optical interface is performed in Step S10. More specifically, the optical plug 200 is inserted into the optical connector 104a in Step S10. The connection of the optical interface is recognized by the CPU of the electronic device 100. In the following step S12, the application of vibration by the vibrator 112 is performed. In the following step S14, the optical communication by the connected optical cable 106 is started.

Figure 7:
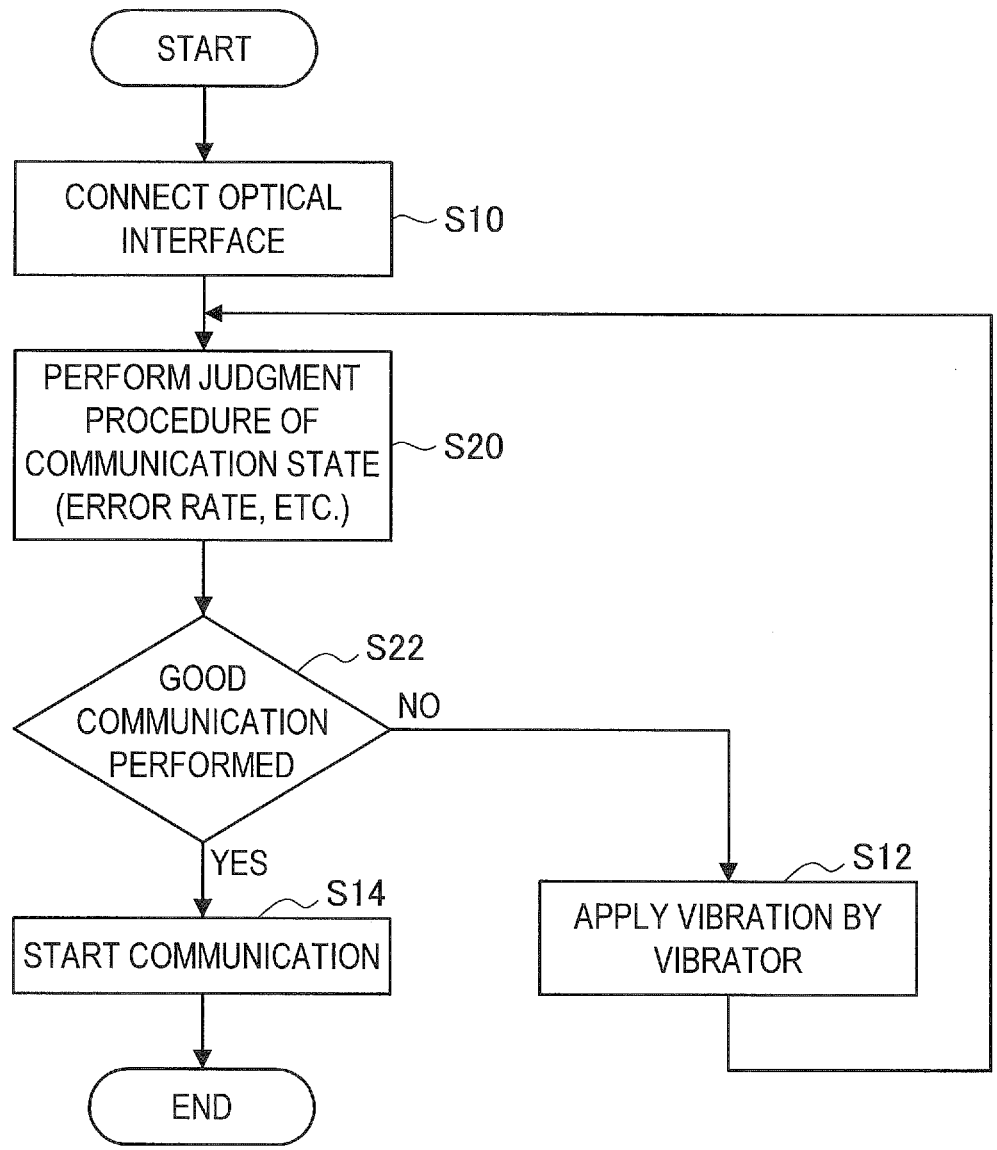
FIG. 7 is a flow chart showing processing of generating vibration of the vibrator when good communication is not performed according to a communication state.

FIG. 7 is a flow chart showing the processing of generating the vibration of the vibrator 112 according to the communication state when good communication is not performed. In FIG. 7, the processing of each of Step S10, S12, and S14 is the same as that of FIG. 6. When the connection of the optical interface is performed in Step S10, a judgment procedure of the communication state by the optical cable 106 is performed in the following step S20. In the judgment procedure of the communication state, the communication state is judged using an error rate and the like.

In the following step S22, as a result of performing the judgment procedure of the communication state, it is judged whether good communication is performed. Then, when good communication is performed, the process proceeds to Step S14, whereby optical communication is started. On the other hand, when good communication is not performed in Step S22, the process proceeds to Step S12, and then the application of vibration by the vibrator 112 is performed. After Step S12, the process returns to Step S20.

Figure 8:
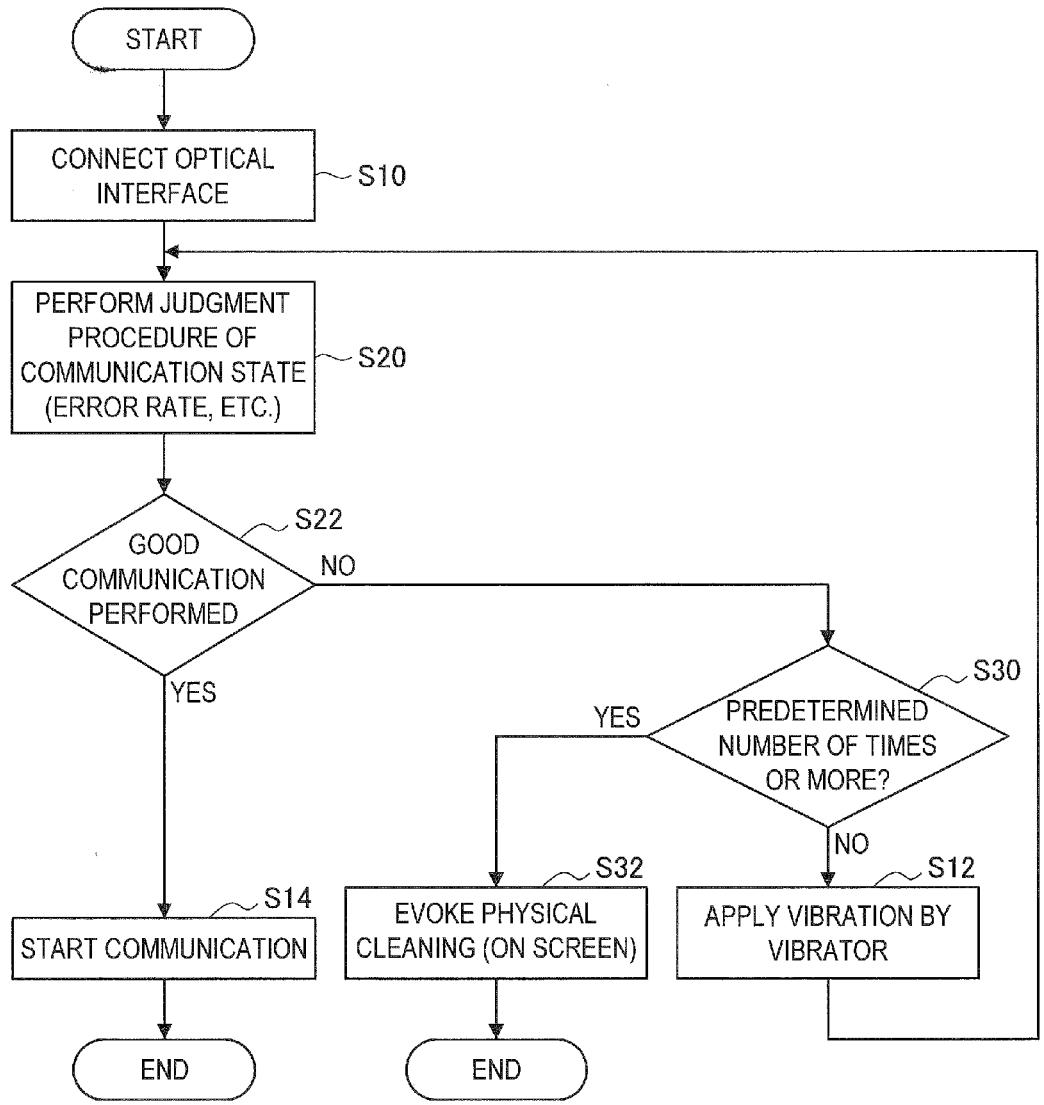
FIG. 8 is a flow chart showing an example in which, in the processing of FIG. 7, when the number of times that it is judged that good communication is not performed is equal to or larger than the predetermined number of times, a display of evoking physical cleaning is displayed on a liquid crystal panel.

FIG. 8 is a flow chart showing an example in which, in the processing of FIG. 7, when the number of times that it is judged that good communication is not performed is equal to or larger than the predetermined number of times in Step S22, a display of evoking physical cleaning is displayed on the liquid crystal panel 102. In FIG. 8, the processing of each of Step S10, S12, S14, S20, and S22 is the same as that of FIG. 6.

In FIG. 8, when good communication is not performed in Step S22, the process proceeds to Step S30, and then it is judged whether the number of times that it is judged that good communication is not performed is equal to or larger than the predetermined number of times in Step S22. Then, when the number of times that it is judged that good communication is not performed is equal to or larger than the predetermined number of times, the process proceeds to Step S32. In Step S32, the display of evoking physical cleaning is displayed on the liquid crystal panel 102.

On the other hand, when the number of times that it is judged that good communication is not performed in Step S30 is less than the predetermined number of times, the process proceeds to Step S12, and then the application of vibration by the vibrator 112 is performed. After Step S12, the process returns to Step S20.

As described above, according to the processing of FIG. 8, when the number of times that it is judged that good communication is not performed is equal to or larger than the predetermined number of times, it is thought that the dirt and dust are not completely removed by the application of vibration by the vibrator 112, and therefore the dirt and dust which were not able to be removed by the vibration by the vibrator 112 can be removed by evoking physical cleaning.

Figure 9:
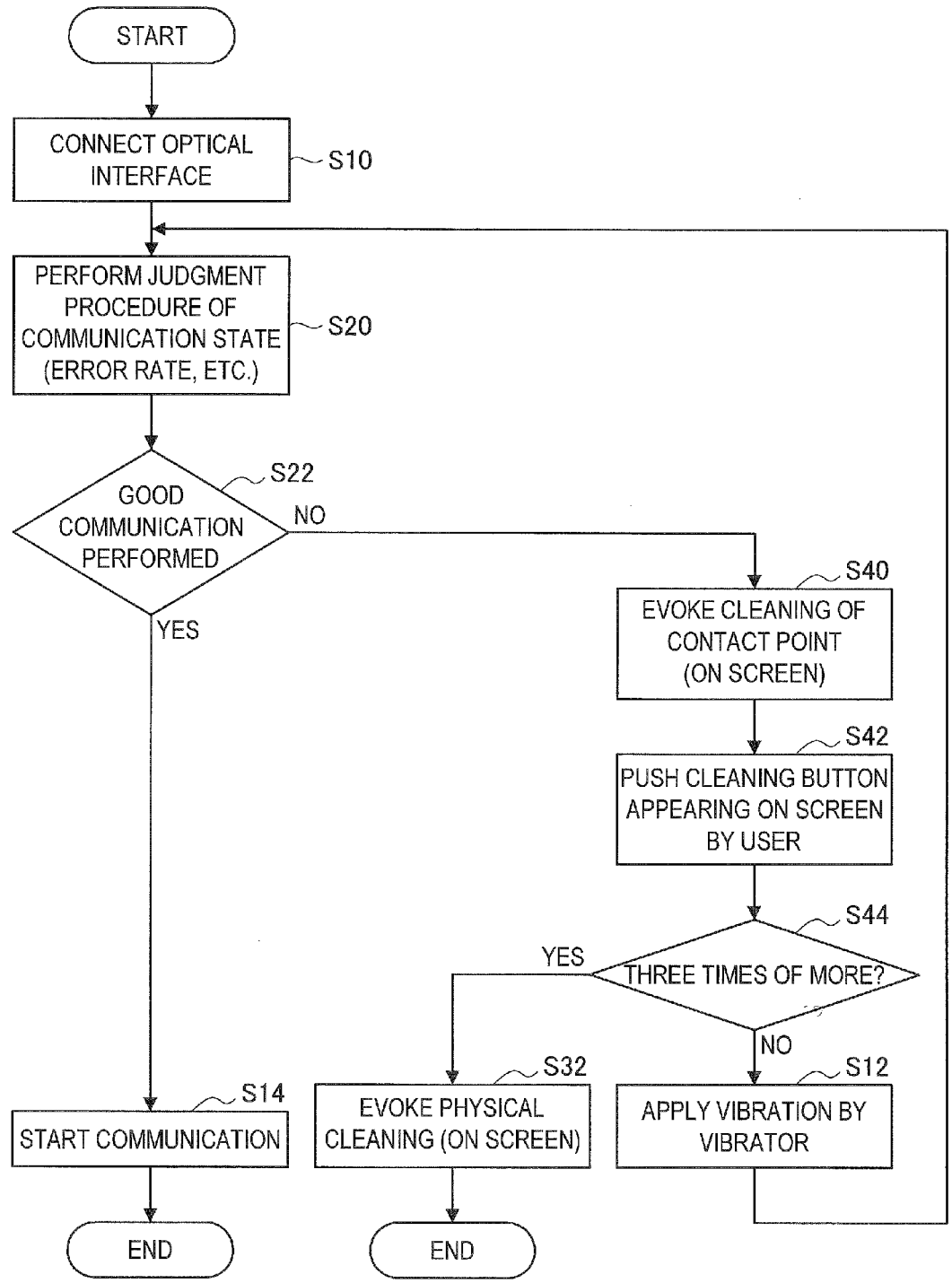
FIG. 9 is a flow chart showing processing in which, in the processing of FIG. 8, when it is judged that good communication is not performed, the display of evoking cleaning of the contact point of the optical connector is displayed on a liquid crystal panel, and then a user pushes a cleaning button on a screen to perform the application of vibration.

FIG. 9 is a flow chart showing processing in which, in the processing of FIG. 8, when it is judged that good communication is not performed, the display of evoking cleaning of the contact point of the optical connector 104 is displayed on the liquid crystal panel 102, and then a user pushes a cleaning button on a screen to thereby perform the application of vibration. In FIG. 9, the processing of each of Step SS10, S12, S14, S20, S22, and S32 is the same as that of FIG. 8.

In FIG. 9, when good communication is not performed in Step S22, the process proceeds to Step S40. Then, the display of evoking cleaning of the contact point (joint surface 104a) of the optical connector 104 is displayed on the liquid crystal panel 102. In the following step S42, a user who looked at the display of Step S40 pushes the cleaning button displayed on the screen of the liquid crystal panel 102.

In the following step S44, it is judged whether the number of times that the user pushed the cleaning button is 3 times or more. Then, when the number of times is three times or more, the process proceeds to Step S32, and then the display of evoking physical cleaning is displayed on the liquid crystal panel 102. On the other hand, when the number of times that the user pushed the cleaning button is less than 3 times, the process proceeds to Step S12, and then the application of vibration by the vibrator 112 is performed. After Step S12, the process returns to Step S20.

As described above, according to the processing of FIG. 9, when good communication is not performed, the display of evoking cleaning is displayed, and then the user who looked at the display pushes the cleaning button displayed on the screen, whereby the cleaning by the vibration of the vibrator 112 can be performed. When the number of times that the user pushed the cleaning button is 3 times or more, it is thought that the dirt and dust are not completely removed by the application of vibration by the vibrator 112, and therefore the dirt and dust which were not able to be removed by the vibration by the vibrator 112 can be removed by evoking physical cleaning.

4. Configuration Example of Electronic Device

Figure 10:
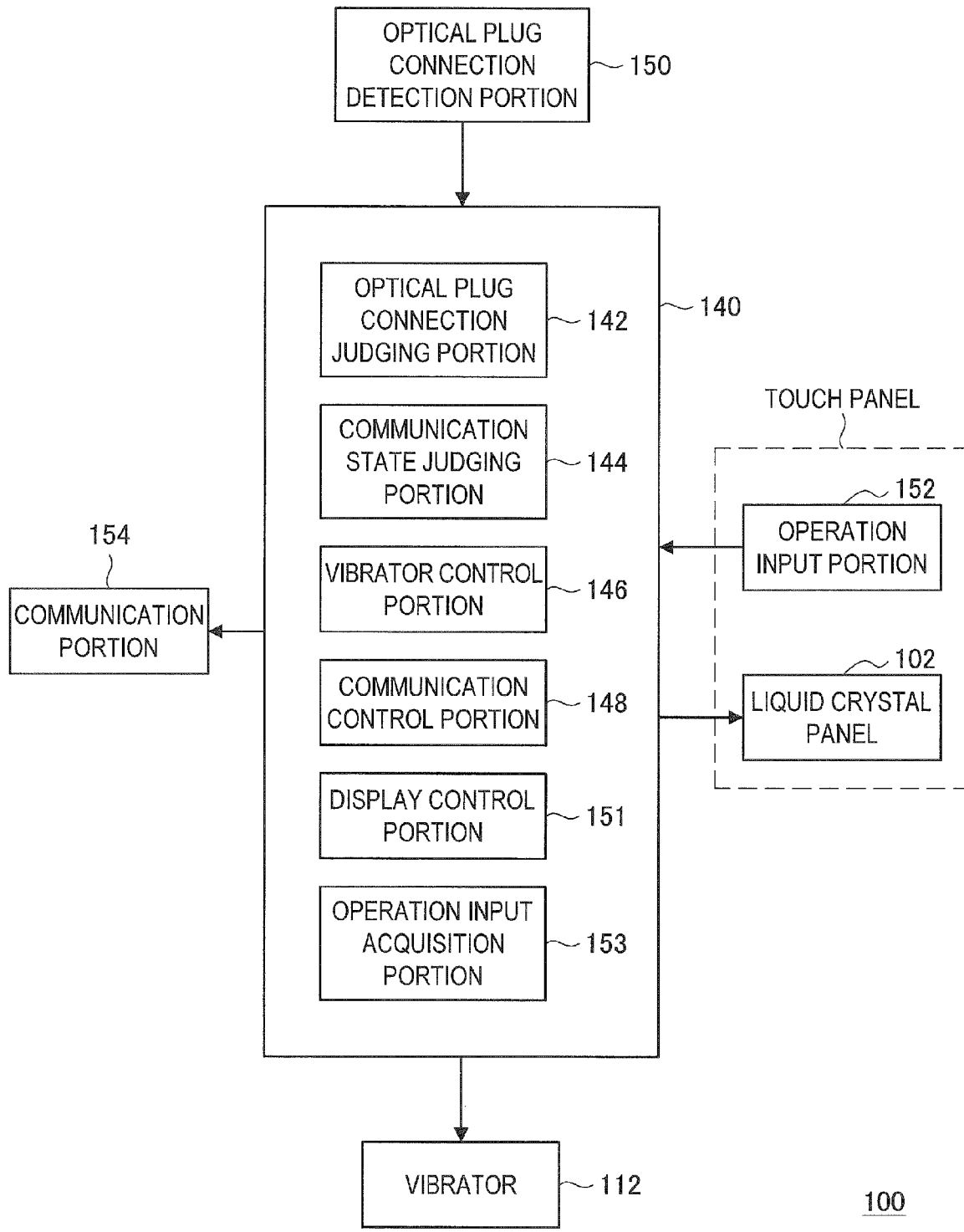
FIG. 10 is a block diagram illustrating the hardware configuration of the electronic device for realizing the processing of each of FIG. 6 to FIG. 9.

FIG. 10 is a block diagram illustrating the hardware configuration of the electronic device 100 for realizing the processing of each of FIG. 6 to FIG. 9. As illustrated in FIG. 10, the electronic device 100 has the liquid crystal panel 102, the vibrator 112, a control portion 140, an optical plug connection detection portion 150, an operation input portion 152, and a communication portion 154.

The control portion 140 contains the CPU (Central processing unit), and controls the entire electronic device 100. The optical plug connection detection portion 150 detects that the optical plug 200 of the optical cable 106 was connected to the optical connector 104. As an example, the optical plug connection detection portion 150 contains a switch attached to the optical connector 104. The operation input portion 152 is a constituent element to which the operation by a user is input and contains a touch sensor attached to the surface of the liquid crystal panel 102 in this embodiment. Therefore, the liquid crystal panel 102 and the operation input portion 152 constitute the touch panel. The communication portion 154 performs data communication through the optical connector 104, the optical plug 200, and the optical cable 106.

The control portion 140 has an optical plug connection judging portion 142, a communication state judging portion 144, a vibrator control portion 146, a communication control portion 148, a display control portion 151, and an operation input acquisition portion 153. The constituent elements of the control portion 140 illustrated in FIG. 10 can be constituted by the CPU and a program (software) for operating the CPU. The program can be stored in a recording medium, such as a memory, of the electronic device 100.

The relationship between the processing with reference to FIG. 6 to FIG. 9 and a functional block of the control portion 140 described is described below. The optical plug connection judging portion 142 judges that the optical plug 200 of the optical cable 106 was connected to the optical connector 104 (Step S10). The communication state judging portion 144 performs a judgment procedure of judging the communication state to judge whether good communication was performed (Steps S20, S22). The vibrator control portion 146 controls the vibrator 112, and performs the application of vibration by the vibrator 112 (Step S12). The communication control portion 148 controls communication through the optical connector 104, the optical plug 200, and the optical cable 106 (Step S14). The display control portion 151 controls the display by the liquid crystal panel 102 (Steps S32, S40). The operation input acquisition portion 153 acquires information on an operation input by a user input into the operation input portion 152 (Steps S42, S44).

As described above, according to this embodiment, the dirt and dust 300 adhering to the joint surface 104a of the optical connector 104 can be dropped from the optical connector 104 to be removed by applying vibration to the optical connector 104 by the vibrator 112. Therefore, the necessity of purchasing an expensive cleaning device to perform cleaning in each junction as in the case of the junction of an optical interface to be used in former infrastructure systems is eliminated. Moreover, in the electronic devices 100, such as a smartphone, an additional member in order to realize a cleaning mechanism becomes unnecessary. Therefore, an increase in the manufacturing cost can be almost zero, so that the cleaning mechanism can be achieved at low cost. Moreover, as a further merit, by automatically performing cleaning when the communication state is not good, cleaning can be easily performed, and cleaning of the joint surface can be achieved while saving the labor of a user of the electronic device 100.

As described above, a suitable embodiment of the present disclosure is described in detail with reference to the attached drawings but the present disclosure is not limited to this example. It is clear that various modifications and alterations are easily conceived by a person having ordinary skill in the art to which the present disclosure pertains within the scope of the technical idea described in claims and it should be understood that the examples are to be included in the technical scope of the present disclosure.

The effects described in this specification are merely descriptive or illustrative and not restrictive. More specifically, the technique according to the present disclosure can demonstrate other effects, which are obvious for a person skilled in the art from the description of this specification, with the above-described effects or in place of the above-described effects.

Additionally, the present technology may also be configured as below:

(1) An electronic device including:
    a vibration portion which generates vibration;
    an optical connector to which an optical cable is connected; and
    a substrate on which the vibration portion and the optical connector are mounted.
(2) The electronic device according to (1), wherein an electronic component is not mounted on the substrate between the vibration portion and the optical connector.
(3) The electronic device according to (1), including:
    a fixing portion which fixes the substrate to a case,
    wherein the vibration portion and the optical connector are disposed in a region separated from the fixing portion by a notch formed in the substrate.
(4) The electronic device according to (1), wherein a hole which penetrates the substrate is provided in a region between the vibration portion and the optical connector.
(5) The electronic device according to (1), further including:
    a vibration transmission member which contacts both the vibration portion and the optical connector and which transmits vibration of the vibration portion to the optical connector.
(6) The electronic device according to (1), wherein the vibration portion contains a vibrator which notifies an incoming call.
(7) The electronic device according to (1), wherein the vibration portion contains a speaker which generates a sound.

(8) The electronic device according to (1), further including:
a connection judging portion which judges that the optical cable is connected; and
a vibration control portion which vibrates the vibration portion when the optical cable is connected.

(9) The electronic device according to (1), further including:
an operation input acquisition portion which acquires an operation input by a user; and
a vibration control portion which vibrates the vibration portion based on the operation input by the user.

(10) The electronic device according to (1), further including:
a communication state judging portion which judges a communication state through the optical cable connected to the optical connector; and
a vibration control portion which vibrates the vibration portion based on the communication state.

(11) The electronic device according to (1), further including:
a display control portion which performs control for a display of evoking physical cleaning of the optical connector when it is judged by the communication state judging portion that the communication state is not good by a predetermined number of times or more.

What is claimed is:

1. An electronic device comprising:
a vibration portion configured to generate vibration;
an optical connector configured to be connected to an optical cable;
a substrate on which the vibration portion and the optical connector are mounted; and
a vibration control portion configured to vibrate the vibration portion based on a communication state, through the optical cable connected to the optical connector, determined using an error rate of communication.

2. The electronic device according to claim 1, wherein an electronic component is not mounted on the substrate between the vibration portion and the optical connector.

3. The electronic device according to claim 1, comprising:
a fixing portion configured to fix the substrate to a case,
wherein the vibration portion and the optical connector are disposed in a region separated from the fixing portion by a notch formed in the substrate.

4. The electronic device according to claim 1, wherein a hole configured to penetrate the substrate is provided in a region between the vibration portion and the optical connector.

5. The electronic device according to claim 1, further comprising:
a vibration transmission member configured to contact the vibration portion and the optical connector and transmit the vibration of the vibration portion to the optical connector.

6. The electronic device according to claim 1, wherein the vibration portion contains a vibrator configured to notify of an incoming call.

7. The electronic device according to claim 1, wherein the vibration portion contains a speaker configured to generate a sound.

8. The electronic device according to claim 1, further comprising:
a connection judging portion configured to determine that the optical cable is connected; and
a vibration control portion configured to vibrate the vibration portion in an event the optical cable is connected.

9. The electronic device according to claim 1, further comprising:
an operation input acquisition portion configured to acquire an operation input by a user; and
a vibration control portion configured to vibrate the vibration portion based on the operation input by the user.

10. The electronic device according to claim 1, further comprising:
a communication state judging portion configured to determine the communication state through the optical cable connected to the optical connector.

11. The electronic device according to claim 10, further comprising:
a display control portion configured to perform control for a display of evoking physical cleaning of the optical connector in an event it is determined by the communication state judging portion that the communication state is not good by a predetermined number of times or more.

* * * * *